United States Patent
Zellner

(10) Patent No.: US 7,283,622 B2
(45) Date of Patent: Oct. 16, 2007

(54) PROCESS INTEGRATED MESSAGING

(75) Inventor: Samuel Zellner, Dunwoody, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 95 days.

(21) Appl. No.: 10/833,420

(22) Filed: Apr. 28, 2004

(65) Prior Publication Data

US 2005/0243980 A1    Nov. 3, 2005

(51) Int. Cl.
*H04M 1/64* (2006.01)
(52) U.S. Cl. .................. 379/88.25; 709/219; 709/238; 379/88.17
(58) Field of Classification Search ........... 379/355.01, 379/355.07, 356.01, 88.17, 88.22, 88.25; 705/3; 707/10, 104.1; 709/219, 223, 238; 717/143

See application file for complete search history.

(56) References Cited

U.S. PATENT DOCUMENTS

| | | | |
|---|---|---|---|
| 6,519,479 B1 * | 2/2003 | Garudadri et al. ......... 455/563 |
| 6,643,622 B2 * | 11/2003 | Stuart et al. ................ 704/275 |
| 6,907,457 B2 * | 6/2005 | Merrell et al. .............. 709/223 |
| 6,944,279 B2 * | 9/2005 | Elsey et al. ............ 379/218.01 |
| 2003/0050891 A1 * | 3/2003 | Cohen ......................... 705/42 |

* cited by examiner

*Primary Examiner*—Gerald Gauthier

(57) ABSTRACT

A process integrated messaging system is provided. The system typically includes messaging interface logic, parsing logic, analyzing logic, and database interface logic. The messaging interface logic receives a first message via a messaging client from an originating party regarding a record. The parsing logic parses the first message into its component parts. The analyzing logic examines the component parts of the message and provides a decision signal in response to the contents of the component parts of the message. The database interface logic receives the decision signal, interfaces to a database, and instructs the database to update the record in accordance with the decision signal. The database controls a number of records, each of the records tracking a process and steps associated with the process. Other systems and methods are also provided.

20 Claims, 5 Drawing Sheets

PROCESS INTEGRATED MESSAGING

TECHNICAL FIELD

The present disclosure relates generally to communications, and more particularly to applying communications to a process.

DESCRIPTION OF THE RELATED ART

Modern messaging systems allow people to communicate information to one another with more speed and ease. Advancements in technology have led to voice messaging systems, electronic mail messaging systems, instant messaging systems, etc. Each of these messaging systems has resulted in higher productivity in the workplace in part due to increased ease of communication.

Communication is especially important in various service related industries, such as the legal industry. For example, poor communication of upcoming deadlines and current events with clients can result in forfeit of rights. Thus, docketing systems were created to help attorneys keep track of and communicate important dates to their clients. These docketing systems typically track a process associated with a work-flow, allowing attorneys and clients to spend fewer resources on tracking work and more time on actually performing the work. However, reporting of dates and approval still requires spending resources on some of the docketing activities. Therefore, there is a need for systems and methods that address these and/or other perceived shortcomings.

SUMMARY OF THE DISCLOSURE

One embodiment, among others, of the present disclosure provides for a process integrated messaging system. A representative system, among others, includes messaging interface logic, parsing logic, analyzing logic, and database interface logic. The messaging interface logic receives a first message via a messaging client from an originating party regarding a record. The parsing logic parses the first message into its component parts. The analyzing logic examines the component parts of the message and provides a decision signal in response to the contents of the component parts of the message. The database interface logic receives the decision signal, interfaces to a database, and instructs the database to update the record in accordance with the decision signal. The database controls a number of records, each of the records tracking a process and steps associated with the process.

A representative method, among others, of integrating a process with a messaging system includes the following steps: receiving a first message via a messaging client from an originating party regarding a record; parsing the first message into a plurality of component parts; analyzing the plurality of component parts for a record identification and an action; providing a decision signal responsive to the contents of the plurality of component parts; and, updating a database responsive to the decision signal, the database being operable to control a plurality of records, each of the plurality of records tracking a process and steps associated with the process.

Other systems, methods, and/or computer programs products according to embodiments will be or become apparent to one with skill in the art upon review of the following drawings and detailed description. It is intended that all such additional system, methods, and/or computer program products be included within this description, be within the scope of the present disclosure, and be protected by the accompanying claims.

BRIEF DESCRIPTION OF THE FIGURES

The disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE DISCLOSURE

Embodiments of the disclosure now will be described more fully with reference to the accompanying drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

Figure 1:
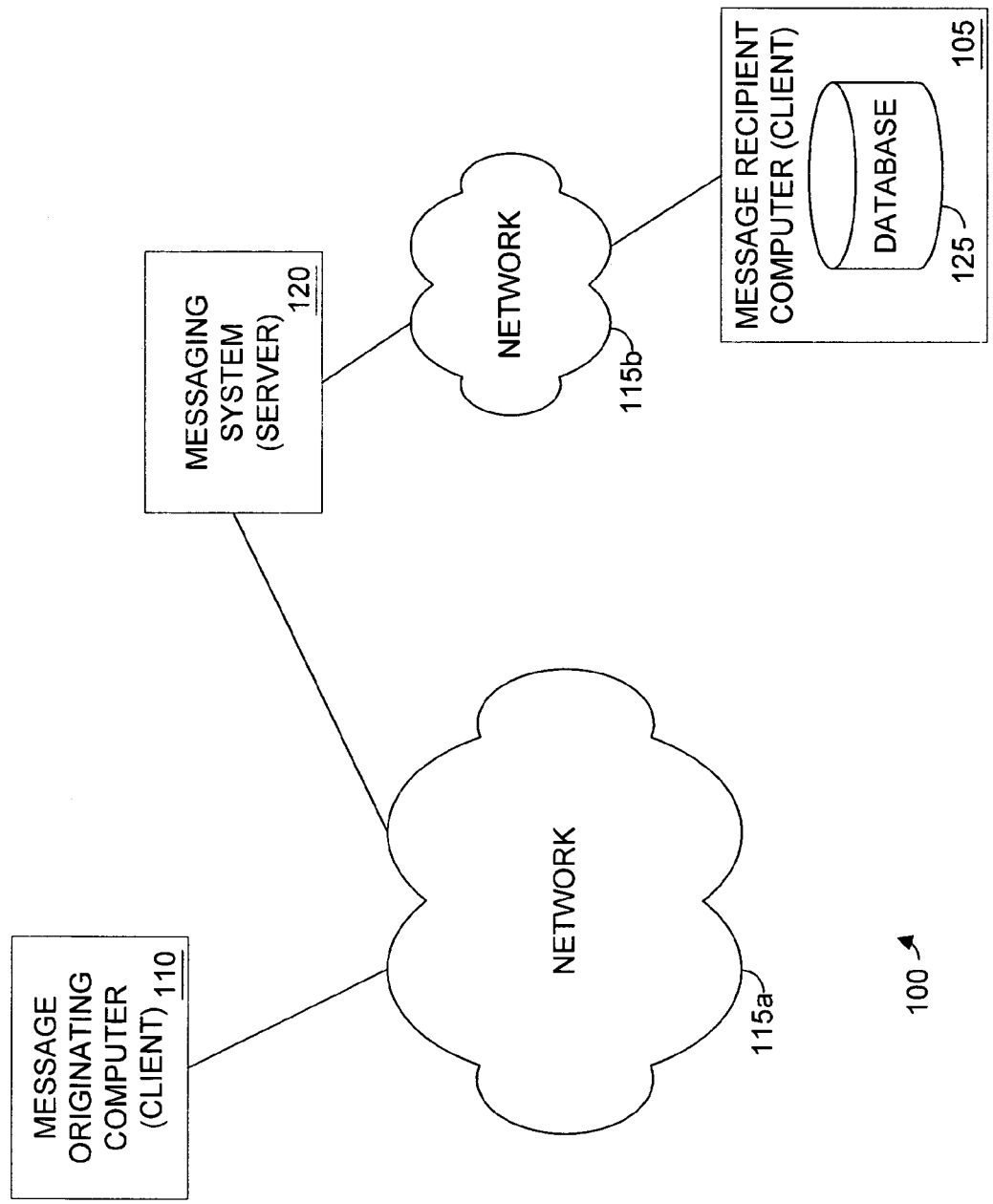
FIG. 1 is a block diagram of an embodiment, among others, of a typical communications system including the present disclosure.

Referring now to FIG. 1, shown is a block diagram of a communications system 100 including an embodiment, among others, of the present disclosure. In particular, the communications system 100 includes a message recipient computer (client) 105 with a process integrated messaging system (260, FIG. 2). The message recipient computer 105 typically receives messages from a message originating computer 110. The message originating computer 110 sends messages to the message recipient computer 105 via a network 115*a*. One skilled in the art should recognize that the network 115*a* could be any of a plurality of network types, including both internet and intranet architectures, or any combinations thereof. For purposes of the present disclosure, however, the details of the network are not important, and it should be understood that any network may be used in conjunction with various embodiments, among others, of the present disclosure.

The message is typically switched and stored by a messaging system 120, such as a server computer, for example. With specific regard to electronic mail (e-mail), the server 120 generally include both a post office protocol 3 (POP3) server and a simple mail transfer protocol (SMTP) server with a multipurpose internet mail extension (MIME). Typically, the e-mail client on computers 105, 110 include a POP3 component (not shown) and an SMTP component (not shown) with MIME encapsulation for non-ascii attachments. The SMTP component on a computer 110 will transfer an e-mail message in the SMTP format to the SMTP server residing on a server 120. The SMTP server stores the message on the POP3 server. Alternatively, one skilled in the art should recognize that the POP3 server can be replaced by, among others, an internet message access protocol 4 (IMAP4) server which can perform all of the POP3 functions and features additional functions for flexibility and efficiency. As mentioned before, the computers 105, 110 each have an e-mail client that includes a POP3 component. The POP3 component on the computer 105 can contact the POP3 server on the server 120 and retrieve messages for the user logged in to the client on computer 105. One skilled in the art should recognize that, although the above description relates to the operation of e-mail, that the scope of the present disclosure is intended to include all messaging systems, such as for example among others, e-mail, telephone, instant messaging, voicemail, internet phone, etc. These systems are known in the art, and should be readily adaptable to the principles of the present disclosure.

The message recipient computer 105 then typically receives the message from the messaging system 120, via a network 115*b*. The network in the various embodiments, among others, of the present disclosure, is any of a plurality of network types, including both internet and intranet architectures, or any combinations thereof. One skilled in the art should recognize that the network 115*b* in various embodiments, among others, of the present disclosure, is part of the first network 115*a*. In specific reference to e-mail, as described above, a messaging client 250 (FIG. 2) included on the message recipient computer 105 typically embodies POP3 and SMTP components (not shown). As one skilled in the art will recognize these protocols merely relate to retrieving and sending e-mail. As such, it is intended that other protocols which operate to send and retrieve e-mail, such as IMAP4, are intended to be included herein. The POP3 component in this embodiment typically downloads e-mail from a messaging server 120 through one of the I/O devices 220, and stores the e-mail in non-volatile storage. Moreover, the POP3 component in an embodiment, among others, of the present disclosure can be set up to retrieve messages for more than one e-mail account. Again, it should be understood, that any messaging systems operable to send and receive messages (instant messages, voice, e-mail, etc.) are intended to be included within the scope of the present disclosure. Moreover, even distributed systems which do not include a server which is operable to store and forward messages are intended to be included within the scope of the present disclosure.

The message recipient computer 105 is further includes a database 125. The database 125 is typically operable to track a process associated with a work-flow. For example, among others, a patent docketing system such as Technology Assessment Management System (TAMS), available Computer Patent Annuities (CPA) Software Solutions, of Le Pecq (Paris), France, operates to track the process of patenting a disclosure which is associated with the workflow of actually preparing the necessary filings for advancing the patenting process. The database 125 would therefore typically include, among others, a plurality of records related to the files currently pending, and a plurality of fields related to the status of the record. Moreover, in various embodiments, among others, of the present disclosure, the database could be built such that it recognizes an expected next step in the process and notifies the user if the updated status does not match the expected next step. Furthermore, one skilled in the art should recognize that in various embodiments, among others, of the present disclosure, the database is on a separate system than the message recipient computer 105, and the message recipient computer 105 merely contains an application to interface with the database 125.

Figure 2:
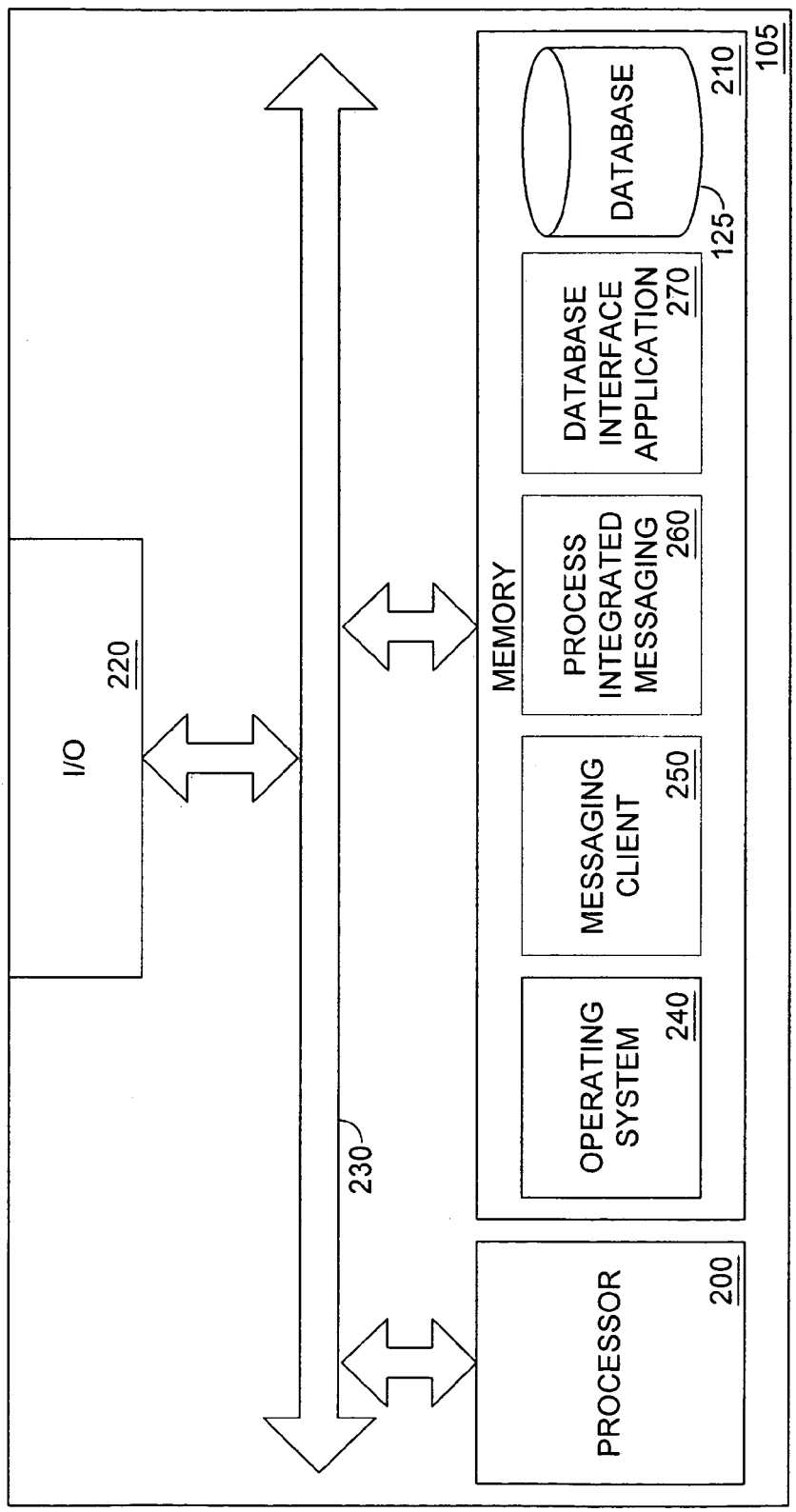
FIG. 2 is a block diagram of an embodiment, among others, of the message recipient computer shown in FIG. 1, including the process integrated messaging application of the present disclosure.

Referring now to FIG. 2, shown is a block diagram of an embodiment, among others, of the message recipient computer 105 shown in FIG. 1. Generally, in terms of hardware architecture, as shown in FIG. 2, the message recipient computer 105 includes a processor 200, memory 210, and one or more input and/or output (I/O) devices 220 (or peripherals) that are communicatively coupled via a local interface 230. The local interface 230 is, for example but not limited to, one or more buses or other wired or wireless connections, as is known in the art. The local interface 230 typically has additional elements, which are omitted for simplicity, such as controllers, buffers (caches), drivers, repeaters, and receivers, among others, to enable communications. Further, the local interface includes address, control, and/or data connections to enable appropriate communications among the aforementioned components.

The processor 200 is a hardware device for executing software, particularly that stored in memory 210. The processor 200 is typically any custom made or commercially available processor, a central processing unit (CPU), an auxiliary processor among several processors associated with the message recipient computer 105, a semiconductor based microprocessor (in the form of a microchip or chip set), a macroprocessor, or generally any device for executing software instructions.

The memory 210 includes any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 210 may incorporate electronic, magnetic, optical, and/or other types of storage media. Note that the memory 210 in some implementations has a distributed architecture, where various components are situated remote from one another, but can be accessed by the processor 210.

The software in memory 210 includes one or more separate programs 240, 250, 260, 270 each of which comprises an ordered listing of executable instructions for implementing logical functions. In the example of FIG. 2, the software in the memory 210 includes a messaging client 250, a process integrated messaging application 260, a database interface application for interfacing with a database 270, and a suitable operating system (O/S) 240. The operating system 240 essentially controls the execution of other computer programs, such as the messaging client 250, the process integrated messaging application 260, and the database interface application 270, and provides scheduling, input-output control, memory management, and communication control and related services.

The messaging client 250, the process integrated messaging application 260, and the database interface application 270 are source programs, executable program (object code), script, or any other entity comprising a set of instructions to be performed. When a source program, then the program needs to be translated via a compiler, assembler, interpreter, or the like, which may or may not be included within the memory 210, so as to operate properly in connection with the O/S 250. Furthermore, the messaging client 250, process integrated messaging application 260, and database interface application 270 are typically written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 220 typically include input devices, for example but not limited to, a keyboard, mouse, scanner, microphone, etc. Furthermore, the I/O devices 220 typically also includes output devices, for example but not limited to, a printer, display, etc. Finally, the I/O devices 220 in some implementations further include devices that communicate both inputs and outputs, for instance but not limited to, a modulator/demodulator (modem; for accessing another device, system, or network), ethernet card, a radio frequency (RF) or other transceiver, a telephonic interface, a bridge, a router, etc.

The software in the memory 210 typically further includes a basic input output system (BIOS) (omitted for simplicity). The BIOS is a set of essential software routines that initialize and test hardware at startup, start the O/S 240, and support the transfer of data among the hardware devices. The BIOS is stored in ROM so that the BIOS is typically executed when the server 115 is activated.

When the message recipient computer 105 is in operation, the processor 200 is configured to execute software stored within the memory 210, to communicate data to and from the memory 210, and to generally control operations of the message recipient computer 105 pursuant to the software. The messaging client 250, the process integrated messaging application 260, the database interface application 270, and the O/S 240, in whole or in part, but typically the latter, are read by the processor 200, perhaps buffered within the processor 200, and then executed.

When the messaging client 250, process integrated messaging application 260, and database interface application 270 are implemented in software, as is shown in FIG. 2, it should be noted that the messaging client 250, process integrated messaging application 260, and database interface application 270 are stored on any computer readable medium for use by or in connection with any computer related system or method. In the context of this document, a computer readable medium is an electronic, magnetic, optical, or other physical device or means that contains or store a computer program for use by or in connection with a computer related system or method. The messaging client 250, process integrated messaging application 260, and database interface application 270, in various implementations, are embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" is any means that can store, communicate, or transport the program for use by or in connection with the instruction execution system, apparatus, or device. The computer readable medium is typically, for example but not limited to, an electronic, magnetic, optical, electromagnetic, infrared, or semiconductor system, apparatus or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

The messaging client 250 in various embodiments, among others, of the present disclosure operates as described in reference to FIG. 1. Furthermore, those skilled in the art should readily understand the details of including a messaging system on a computer. The database interface application 270 is typically used to interface with the database 125. As known to those skilled in the art, the database interface application 270 can be used by an administrator or another user with appropriate access authority to modify the records and/or fields stored in the database. The process integrated messaging application 260 in one embodiment, among others, of the present disclosure integrates the messaging client 250 and the database interface application 270.

Figure 3:
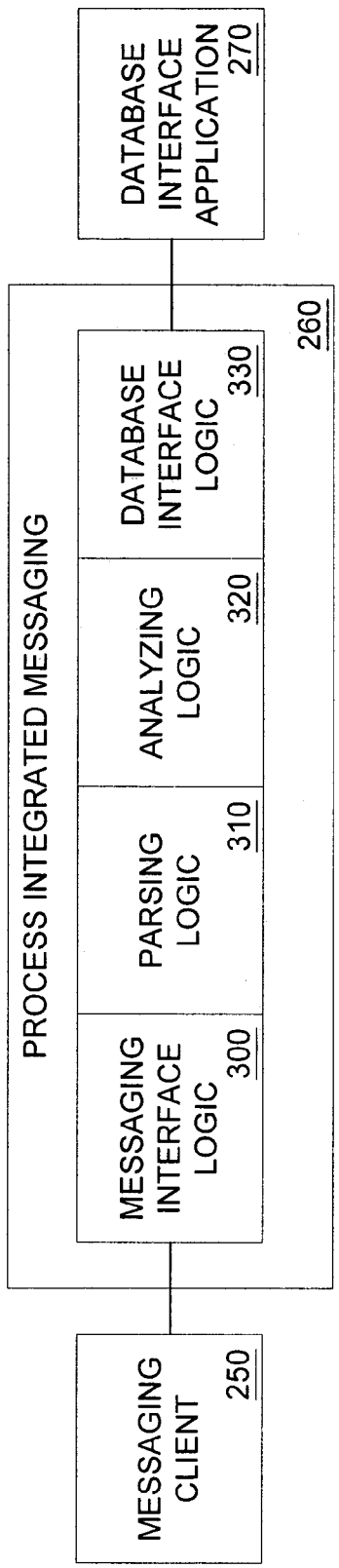
FIG. 3 is a block diagram of an embodiment, among others, of the process integrated messaging application shown in FIG. 2.

Referring now to FIG. 3, shown is a block diagram depicting the interaction of the programs 250, 260, 270 stored in the memory 210 of the message recipient computer 105. In particular, the process integrated messaging application 260 includes, among others, messaging interface logic 300, parsing logic 310, analyzing logic 320, and database interface logic 330. For purposes of furthering understanding of the present disclosure, the messaging interface logic 300 is shown connected to the messaging client 250, and the database interface logic 330 is shown connected to the database interface application 270, though there exists no permanent physical connection between these items. Instead, a logical connection is what is intended to be conveyed between these elements.

The messaging interface logic 300 is used as an interface between the messaging client 250 and the process integrated messaging application 260. The messaging interface logic 300 is typically operable to communicate with the messaging client 250. In particular, the messaging interface logic 300 receives event stimuli from the messaging client 250, and sends the messaging client 250 requests to transfer messages to the process integrated messaging application 260. Furthermore, the messaging interface logic 300, in some embodiments, among others, of the present disclosure is operable to transfer an outgoing message to the messaging client 250 and instruct the messaging client 250 to send the message. One skilled in the art should further recognize that, in some embodiments, among others, of the present disclosure, the messaging interface logic 300 is operable to instruct the messaging client to delete messages for purposes of saving memory. One example, among others, of a suitable messaging interface is the .NET (dotNET) application programming interface (API) available from Microsoft, Corp. of Redmond, Wash.

Upon receiving each of the messages from the messaging client 250, via the messaging interface logic 300, the process integrated messaging application 260 will typically parse the message using the parsing logic 310. In particular the parsing logic is operable to separate the message into its component parts. For example, a message is typically separated into component parts which can include, among others: a "From" field representation; a "To" field representation; a "Subject" field representation; a "Text" field representation; and, a "Signature" field representation. One skilled in the art would understand that each of these component parts represents a separate portion of an e-mail message. However, it should be understood that other types of messages will typically include component parts which differ from the component parts enumerated above. Moreover, it should be readily apparent to those skilled in the art how to parse these other types of messages to integrate them with the database interface application 270. For example, among others, a telephonic message could be parsed by capturing a caller's identification, and using speech recognition software to convert the voice message to text.

The parsed message is then analyzed by the analyzing logic 320. The analyzing logic 320 scans the component parts of the message to determine, among others, what file is referenced and what action is requested, and in some embodiments, among others, the analyzing logic is operable to compose an outgoing message to a responsible party associated with the database 125 of the updated status. This message will typically be sent from the messaging client via the messaging interface logic 300. Moreover, in some embodiments, among others, of the present disclosure, the analyzing logic 320 is operable to determine whether the action is an expected action based upon the typical steps involved in completion of the process, and is further operable to compose a message to the responsible party notifying the responsible party that an unexpected status update was received. In various embodiments, among others, of the present disclosure, an unexpected status update could be applied to the database, ignored until a response from the responsible party is received, or ignored for updating manually by the responsible party via the database interface application. Furthermore, those skilled in the art should recognize that the analyzing logic in some embodiments, among others, of the present disclosure compares the "From" field representation with stored authorized parties prior to applying the update, and further notifies the responsible party if the "From" field representation does not match the stored authorized parties.

Upon analyzing the component parts of the message, the analyzing logic 320 instructs the database interface logic 330 to send an update to the database interface application 270, provided that the update is recognized by the analyzing logic 320, and includes an expected update and/or by an authorized party in alternative embodiments, among others, of the present disclosure. The database interface logic 330 is typically operable to communicate updates to the database interface application 270. One skilled in the art should recognize, however, that in alternative embodiments, among others, of the present disclosure, the database interface logic 330 is operable to interface directly to the database 125. Therefore, various embodiments, among others, of the present disclosure do not include the database interface application. Furthermore, in some embodiments, among others, of the present disclosure, the database is operable to respond to status updates from the database interface logic 330 with an error signal indicating that a problem occurred while attempting to update the record in accordance with instructions from the database interface logic 330. The database interface logic 330 would communicate the error signal to the analyzing logic 320, and the analyzing logic 320 would compose a message indicating the update failure to the responsible party.

One skilled in the art should recognize that in some embodiments, among others, of the present disclosure, the process integrated messaging system is integrated into the messaging client 250. Thus, the process integrated messaging system 260 would not use the messaging interface logic 300 to communicate with the messaging client, because the messaging client 250 is included within the process integrated messaging system 260. Similarly, the database 125 in some embodiments, among others, of the present disclosure is integrated within the process integrated messaging system 260. Those skilled in the art should recognize that such an integration would similarly eliminate the database interface logic 330.

One skilled in the art should recognize that alternative embodiments, among others, of the present disclosure exist, wherein the process integrated messaging application include authentication logic (not shown). The authentication logic could be used to help ensure that the person sending the message is authorized to update the status of the record. Moreover, the authentication logic could be used to help ensure that the person sending the message is in fact the person he or she claims to be. For example, an e-mail message could be analyzed for a signature that includes the correct pretty-good-privacy (PGP) key, a voice could be analyzed and compared with an existing record of the person's voice, a video could be analyzed and compared with an existing record of the person's image, etc. The authentication logic could be especially useful when dealing with sensitive information, such as is the case with most legal docketing systems.

Figure 4:
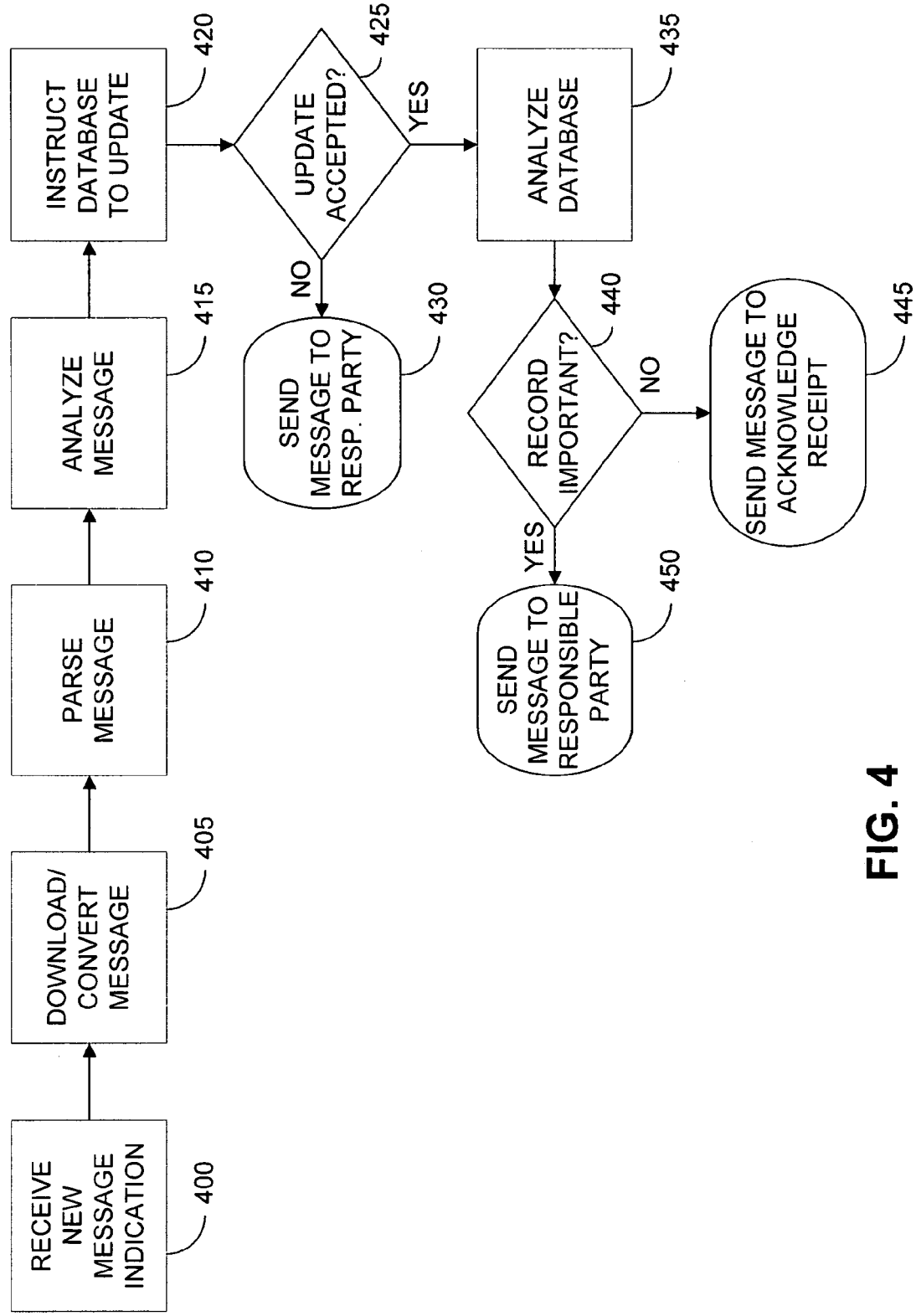
FIG. 4 is a flowchart illustrating the flow of an embodiment, among others, of the process integrated messaging application of FIG. 2.

Referring now to FIG. 4, shown is a flowchart illustrating the operation of an embodiment, among others, of the process integrated messaging application of FIG. 2. In step 400, the process integrated messaging application 260 receives a new incoming message indication. Typically, all messaging clients 250 have a way to alert the user to a new incoming message. For example, among others, voicemail typically has a visual indicator such as a flashing light to indicate a new message, e-mail clients typically sound an audible indicator and put a new message icon in the tray, and instant messaging typically also uses an audible message indicator as well as a tray icon. As such, the process integrated messaging application 260, specifically the messaging interface logic 300 (FIG. 3) can trigger upon sensing one of these new message indications from the messaging client 250.

In step 405, the process integrated messaging application 260 downloads and converts the message from the messaging client 250. The messaging interface logic 300 requests the message from the messaging client 250. Upon receiving the message from the messaging client 250, the messaging interface logic 300 is operable to convert the message into a format usable by the process integrated messaging application 260.

In step 410, the process integrated messaging application 260 parses the message into its component parts. Specifically, the parsing logic 310 is operable to strip the message in component parts. For example, an e-mail would typically include, among others, a "From" field representation, a "Subject" field representation, and a "Body" field representation. These field representations would be separated by the parsing logic such that the field representations could be more easily analyzed.

In step 415, the process integrated messaging application 260 analyzes the component parts of the message. In particular, the analyzing logic 320 is operable to search the component parts for patterns that resemble the data stored in the database 125 and update actions to be made to the database 125. For example, the data stored in the database 125 in some embodiments, among others, is docketing information. In this example, the analyzing logic would search for a file number, and an action or status update to be performed. The analyzing logic in some embodiments, among others, is also operable to analyze the originator of the message to ensure that the originator of the message has permission to perform the requested action or status update.

In step 420, the process integrated messaging application 260 instructs the database to update in accordance with the analyzing step 415. In particular, the database interface logic 330 is operable to instruct the database interface application 270 to perform an action or status update on the record stored in the database 125. The information provided by the analyzing logic 320 is used by the database interface logic to provide the action or status update instructions to the database interface application 270.

In step 420, the process integrated messaging application 260 receives an acknowledgement from the database interface application 270 regarding whether the action or status update was successful. If the action or status update was not successful, the process integrated messaging application 260, in some embodiments, among others, of the present disclosure provides notice to a responsible party regarding the failure of the action or status update, as shown by step 430. In particular, the analyzing logic 320 in various embodiments, among others, is operable to compose an error message and send the message to the responsible party via the messaging interface logic 300 and the messaging client 250. The responsible party, in various embodiments, among others, is a database administrator, the message originator, a third party responsible for tracking the database, or any combination thereof.

If the action or status update was successful, in some embodiments, among others, of the present disclosure the process integrated messaging application requests the record from the database, and analyzes the record to determine whether a next step can be determined from the record, as shown in step 435. In particular, the analyzing logic 320 in some embodiments, among others, of the present disclosure is operable to instruct the database interface logic 330 to retrieve the record from the database 125. The analyzing logic 320 then determines whether the record is an important record based on indicators used in the process, such as, for example, a due date, to determine importance of the record. It should be noted that in various embodiments, among others, of the present disclosure, the importance of a record is based upon a next sequence in a process associated with the record, an event associated with the process, or an intrinsic importance associated with the matter or record itself. It should also be noted that, in some embodiments, among others, of the present disclosure, the importance of a record could be variable, e.g. based on a sum of the importance of some or all of the fields that comprise the record. In a patent docketing system, these indicators could be a foreign filing, an important date, restriction requirements, continuations, or even a flag added to the record to indicate a level of importance.

In step 440, the process integrated messaging application 260 decides whether the record is important. If the record is not important, the process integrated messaging application 260 sends a message to the message originator to acknowledge receipt of the update, as shown in step 445. In particular, as discussed above, the analyzing logic 320 in various embodiments, among others, of the present disclosure, is operable to compose a message and send a message via the messaging interface logic 300 and the messaging client 250. The analyzing logic 320 is further configured in some embodiments, among others, to send a message to the responsible party to notify him or her of the action or status update.

If the record is important, the process integrated messaging system 260 sends a message to the responsible party, as shown in step 450. In an embodiment, among others, of the present disclosure, the analyzing logic typically composes a message notifying a responsible party of the importance of the file. For example, among others, in a patent docketing system, the message might include approval to begin work on completing the next step in the process. In this example, the analyzing logic may determine that a critical date is imminent, and that the work should be completed, or that the record is related to an important file, and that all work to complete the process should be completed as soon as possible. One skilled in the art should recognize that these are merely a few examples of the characteristics that might make accelerated processing of the record significant, and that all other characteristics which make accelerated processing significant are intended to be included within the scope of the present disclosure.

Figure 5:
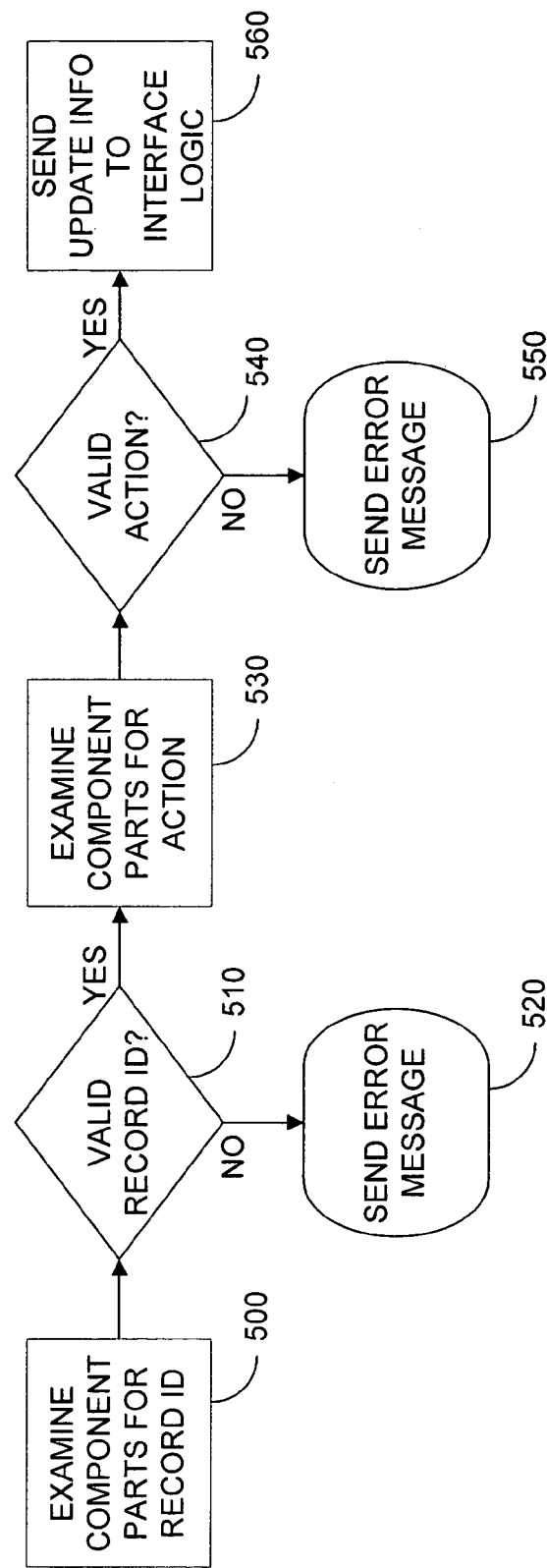
FIG. 5 is a flowchart illustrating the flow of an embodiment, among others, of the analyzing logic of FIG. 3.

Referring now to FIG. 5, shown is a flowchart illustrating an embodiment, among others, of the analyzing logic 320 of FIG. 3. In step 500, the analyzing logic 320 examines the component parts of the previously parsed message for a record identification number. In an embodiment, among others, where the database 125 is a docketing database, the record identification number is a file number. The analyzing logic 320 in one embodiment, among others, periodically polls the database 125 for new records, and adds the record identification number associated with any new records to a record identification list. Upon receipt of a new message, the analyzing logic then compares the record identification list with the component parts of the message to determine whether a valid record identification number exists in the message. It should be recognized that the analyzing logic could search the text against each file number. However, alternatively, the analyzing logic could search for a pattern that matched a standard format for record identification numbers, and compare any matching patterns found to the record identification list. In yet another alternative embodiment, the analyzing logic 320 could merely search for a pattern matching the record identification pattern, and rely on the database 125 to determine whether the record exists and to provide an error message if the record does not exist. Those skilled in the art should recognize myriad other searching techniques, including pattern recognition logic, that could be applied to the present disclosure, and it is intended that each such searching technique be included within the scope of the present disclosure.

In step 510, the analyzing logic determines whether there is a valid record identification number. If there is no valid record identification number, the analyzing logic 320 sends a reply message to a responsible party indicating the error that occurred, as shown in step 520. As discussed previously, the analyzing logic 320 is operable to compose a message indicating the error that occurred, and send the message via the messaging interface logic 300 and the messaging client 250. Further, the responsible party could be database administrator, the message originator, a third party responsible for tracking the database, or any combination thereof. Moreover, the error message can be tailored to the specific error encountered. In other words, the error message can notify the responsible party that no valid record identification was found in the original message.

If in step 510, there is a valid record identification number, the analyzing logic 320 examines the component parts of the message for an action or status update. The analyzing logic 320 in one embodiment, among others, compares a list of recognized commands with the component parts of the message. Alternatively, the analyzing logic 320 in some embodiments, among others, is operable to query the database 125 via the database interface logic 330 and database interface application 270 for current status of the record. The analyzing logic 320 is then operable to determine what step(s) may be likely to be next, and searching the component parts of the message for the likely next step(s). One skilled in the art should recognize, however, that there exist myriad procedures, including pattern recognition logic, among others, which may be utilized to find an action in conjunction with the present disclosure. Each of these procedures is intended to be included within the scope of the present disclosure.

In step 540, the analyzing logic 320 determines whether a valid action or status update has been found within the component parts of the message. If there have been no valid actions or status updates found within the component parts of the message, the analyzing logic composes an error message and sends the error message to a responsible party via the messaging interface logic 300 and the messaging client 250, in accordance with step 550. The responsible party, in various embodiments, among others, of the present disclosure is a database administrator, the message originator, or a third party responsible for tracking the database, or any combination thereof. Moreover, the error message can be tailored to the specific error encountered. In other words, the error message can notify the responsible party that no valid action was found in the original message, and in some embodiments, among others, provides a list of valid actions.

If a valid action was found in step 540, the analyzing logic 320 sends the update information to the interface logic. The update information includes the record identification number and the action to be performed to update the status of the record. One skilled in the art should recognize that in some embodiments, among others, the analyzing logic 320 includes an authentication step(s) which matches the message originator to a list of approved users with authorization to update the record. In alternative embodiments, among others, the record in the database 125 contains an authorized user field which is checked against the message originator to help ensure that unauthorized users do not tamper with the database 125.

One skilled in the art should further recognize that in some embodiments, among others, of the present disclosure that the examining steps 500, 530 eliminate some of the component parts of the message such that not every component part of the message is examined. For example, among others, the "From" field representation of an e-mail would typically not be examined for the record identification number or for a valid action to be performed on the record. As such, the analyzing logic 320 in some embodiments, among others, of the present disclosure are operable to examine the component parts of the message which are likely to include the items for which the analyzing logic is searching.

Process and function descriptions and blocks in flow charts can be understood as representing, in some embodiments, modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, or transport the software for use by or in connection with the instruction execution system, apparatus, or device.

It should also be emphasized that the above-described embodiments of the present disclosure are merely possible examples of implementations set forth for a clear understanding of the principles of the disclosure. Many variations and modifications may be made to the above-described embodiment(s) of the disclosure without departing substantially from the principles of the disclosure. All such modifications and variations are intended to be included herein within the scope of this disclosure and the present disclosure and protected by the following claims.

The invention claimed is:

1. A process integrated messaging system comprising:
   messaging interface logic operable to receive a first message via a messaging client from an originating party regarding a record, the messaging client being remote to the messaging interface logic;
   parsing logic operable to parse the first message into a plurality of component parts, the plurality of component parts comprising a component identifying the originating party;
   analyzing logic operable to examine the plurality of component parts separately and provide a decision signal responsive to contents of the plurality of component parts; and
   database interface logic operable to receive the decision signal and interface to a database and instruct the database to update the record responsive to the decision signal, the database being operable to control a plurality of records, each of the plurality of records tracking a workflow process and steps associated with the workflow process, wherein:
   the messaging interface logic is operable to receive a second message from said at least one responsible party, the second message providing instructions regarding handling of the record; and
   the analyzing logic is operable to instruct the messaging interface logic to send a third message to at least one responsible party, the third message including status regarding the record and to update the record in accordance with the second message and instruct the messaging interface logic to send a fourth message to the originating party, the fourth message providing instructions for further handling of a file associated with the record.

2. The system of claim 1, wherein the database is a docketing system.

3. The system of claim 1, wherein the analyzing logic comprises pattern recognition logic operable to match at least one of video, text, and audio included in the first message to existing records in the database and to recognize actions that can be performed on the records in the database, and provide a decision signal to the database interface logic responsive to the pattern recognition logic.

4. The system of claim 3, wherein the analyzing logic further comprises an authentication logic operable to authenticate the originating party identified by the component identifying the originating party and provide a decision signal responsive to the authentication logic.

5. The system of claim 4, wherein the decision signal is further operable to instruct the database interface logic to open a database application to perform the database update.

6. The system of claim 4, wherein the originating party is authenticated to ensure that the originating party has permission to perform the database update.

7. The system of claim 1, wherein the first message comprises an e-mail message.

8. The system of claim 1, wherein the first message comprises an instant message.

9. A method of integrating a process with a messaging system, the method comprising:
- receiving a first message via a remote messaging client from an originating party regarding a record;
- parsing the first message into a plurality of component parts, the plurality of component parts comprising a component identifying the originating party;
- analyzing the plurality of component parts for a record identification and an action;
- providing a decision signal responsive to contents of the plurality of component parts;
- updating a database responsive to the decision signal, the database being operable to control a plurality of records, each of the plurality of records tracking a workflow process and steps associated with the workflow process;
- sending a second message to at least one responsible party, the second message including status regarding the record;
- receiving a third message from said at least one responsible party, the third message providing instructions regarding handling of the record;
- updating the record in accordance with the third message; and
- sending a fourth message to the originating party, the fourth message providing instructions for further handling of a file associated with the record.

10. The method of claim 9, wherein the database is a docketing system.

11. The method of claim 9, further comprising:
- matching a pattern in at least one of video, text, and audio in the first message to existing records in the database to recognize actions that can be performed on the records in the database; and
- providing a decision signal responsive to the pattern recognition logic.

12. The method of claim 11, further comprising:
- authenticating the originating party identified by the component identifying the originating party; and
- providing a decision signal responsive to authentication of the originating party.

13. The method of claim 12, wherein the originating party is authenticated to ensure that the originating party has permission to perform the database update.

14. The method of claim 9, wherein the first message comprises an e-mail message.

15. The method of claim 9, wherein the first message comprises an instant message.

16. A tangible computer readable medium having a program for integrating a process with a messaging system, the program operable, when executed by a processor, to perform:
- receiving a first message via a remote messaging client from an originating party regarding a record;
- parsing the first message into a plurality of component parts, the plurality of component parts comprising a component identifying the originating party;
- analyzing the plurality of component parts for a record identification and an action;
- providing a decision signal responsive to contents of the plurality of component parts;
- updating a database responsive to the decision signal, the database being operable to control a plurality of records, each of the plurality of records tracking a workflow process and steps associated with the workflow process;
- sending a second message to at least one responsible party, the second message including status regarding the record;
- receiving a third message from said at least one responsible party, the third message providing instructions regarding handling of the record;
- updating the record in accordance with the third message; and
- sending a fourth message to the originating party, the fourth message providing instructions for further handling of a file associated with the record.

17. The program of claim 16, further comprising:
- matching a pattern in at least one of video, text, and audio included in the first message to existing records in the database to recognize actions that can be performed on the records in the database; and
- providing a decision signal responsive to the pattern recognition logic.

18. The program of claim 17, further comprising:
- authenticating the originating party identified by the component identifying the originating party; and
- providing a decision signal responsive to authentication of the originating party.

19. The program of claim 18, wherein the originating party is authenticated to ensure that the originating party has permission to perform the database update.

20. The program of claim 16, wherein the first message comprises an instant message.

* * * * *